United States Patent [19]

Shaw et al.

[11] Patent Number: 5,593,215

[45] Date of Patent: Jan. 14, 1997

[54] ELECTRO-HYDRAULIC CONTROLS FOR BRAKE TYPE TRACTION CONTROL SYSTEM

[75] Inventors: Feng-Rong Shaw, Menomonee Falls; Allen L. Filo, Sussex, both of Wis.

[73] Assignee: Fluid Power Industries, Inc., Lincolnshire, Ill.

[21] Appl. No.: 622,258

[22] Filed: Mar. 26, 1996

Related U.S. Application Data

[63] Continuation of Ser. No. 319,760, Oct. 7, 1994, abandoned.

[51] Int. Cl.$^6$ ................................................ B60T 17/04
[52] U.S. Cl. ........................................ 303/113.2; 303/116.2
[58] Field of Search ............................. 303/113.2, 113.1, 303/116.1, 900, 187, 188

[56] References Cited

U.S. PATENT DOCUMENTS

| | | | |
|---|---|---|---|
| 3,866,983 | 2/1975 | Kondo | 303/900 |
| 4,344,139 | 8/1982 | Miller et al. | 364/426 |
| 4,349,233 | 9/1982 | Bullard et al. | 303/96 |
| 4,361,871 | 11/1982 | Miller et al. | 364/426 |
| 4,745,552 | 5/1988 | Phelps et al. | 364/426 |
| 4,774,976 | 10/1988 | Janecke et al. | 137/129.08 |
| 5,011,238 | 4/1991 | Brown, Jr. | 303/113.2 |
| 5,219,210 | 6/1993 | Maenara | 303/900 |

FOREIGN PATENT DOCUMENTS

| | | | |
|---|---|---|---|
| 4002635 | 8/1991 | Germany | 303/900 |
| 4271946 | 9/1992 | Japan | 303/113.2 |

*Primary Examiner*—Matthew C. Graham
*Attorney, Agent, or Firm*—Roper & Quigg

[57] ABSTRACT

A hydraulic control system for providing a hydraulic control pressure for operating the brake system of a brake type traction control system for a vehicle develops the control pressure between a pair of orifices in conjunction with a pulse width modulated hydraulic control valve.

7 Claims, 3 Drawing Sheets

5,593,215

ELECTRO-HYDRAULIC CONTROLS FOR BRAKE TYPE TRACTION CONTROL SYSTEM

This is a continuation of application Ser. No. 08/319,760 dated Oct. 7, 1994, now abandoned.

BACKGROUND OF THE INVENTION

1. Field of the Invention

This invention relates to an electro-hydraulic control system for providing a hydraulic control pressure to a brake system so as to apply a brake torque to a powered wheel of a vehicle when excessive slippage of the wheel is detected.

2. Discussion of the Prior Art

Traction control systems are known which detect slippage of one powered wheel of a vehicle and in response transfer torque to another wheel, typically on the other side of the vehicle. In one such system, the brake of the slipping wheel is applied when the speed of the slipping wheel exceeds the speed of the wheel on the other side of the axle by a predetermined amount, and the application of the brake causes torque to be transferred to the slower wheel through the differential of the axle. It is to such a system that the present invention applies.

Such a system may be applied to the treadle operated brake retarder system of a heavy vehicle, such as an earth moving vehicle or a semi-truck tractor. In a brake retarder system, a separate treadle is provided which when depressed applies the brakes to only the rear wheels of the vehicle. Such systems are commonly provided so as to slow down the vehicle when descending long grades. In such a system, a single treadle is mechanically connected to operate two valves, one of which is for the left rear wheel and the other of which is for the right rear wheel.

While manual operation is possible with these valves by virtue of the foot operated treadle, each valve can also be provided with a hydraulic pilot pressure port so that each valve may be operated independently of the other by a separate hydraulic pilot pressure for that valve. In such brake valves, the amount of brake torque applied to the wheel is proportional to the hydraulic pressure applied to the pilot port. The present invention relates to a hydraulic control system for providing this pilot pressure to a brake valve, be it the brake valve of a brake retarder system, or some other brake valve which is operated by a hydraulic pressure.

In a traction control system, fast response is desired, so as to begin slowing the slipping wheel as soon as possible with the resultant transfer of torque to the other wheel, so that the vehicle will move forward and not dig itself into a rut. However, smooth and steady operation is also desirable so as to avoid abrupt loads on the brake system, the transmission and the engine of the vehicle. Also, because there are a wide variety of brake systems to which a hydraulic system for controlling the brake system may be applied, it is desirable that the hydraulic system be adaptable to a wide variety of brake systems, as well as to a wide variety of hydraulic pressure supplies, which are typically provided as part of the vehicle.

SUMMARY OF THE INVENTION

The invention provides a hydraulic pressure control system which satisfies these needs. A system of the invention is for providing at least two independent hydraulic control pressures to the pressure operated brake system of a vehicle traction control for independently controlling the braking torque on the same number of powered wheels on opposite sides of a vehicle. The hydraulic pressure control system includes, for each of at least two powered wheels, a hydraulic pressure passage with an upstream orifice and a downstream orifice in the passage. A pulse width modulated valve is provided in the passage in communication with the orifices for developing a hydraulic control pressure in the passage between the orifices for operating the brake system, and means are provided for communicating the hydraulic control pressure from the passage between the orifices to the brake system. Thereby, a fast response hydraulic control pressure is developed without exerting sudden impacts or abrupt loads on the brake system, or on the vehicle's engine or transmission.

DETAILED DESCRIPTION OF THE PREFERRED EMBODIMENTS

Figure 1:
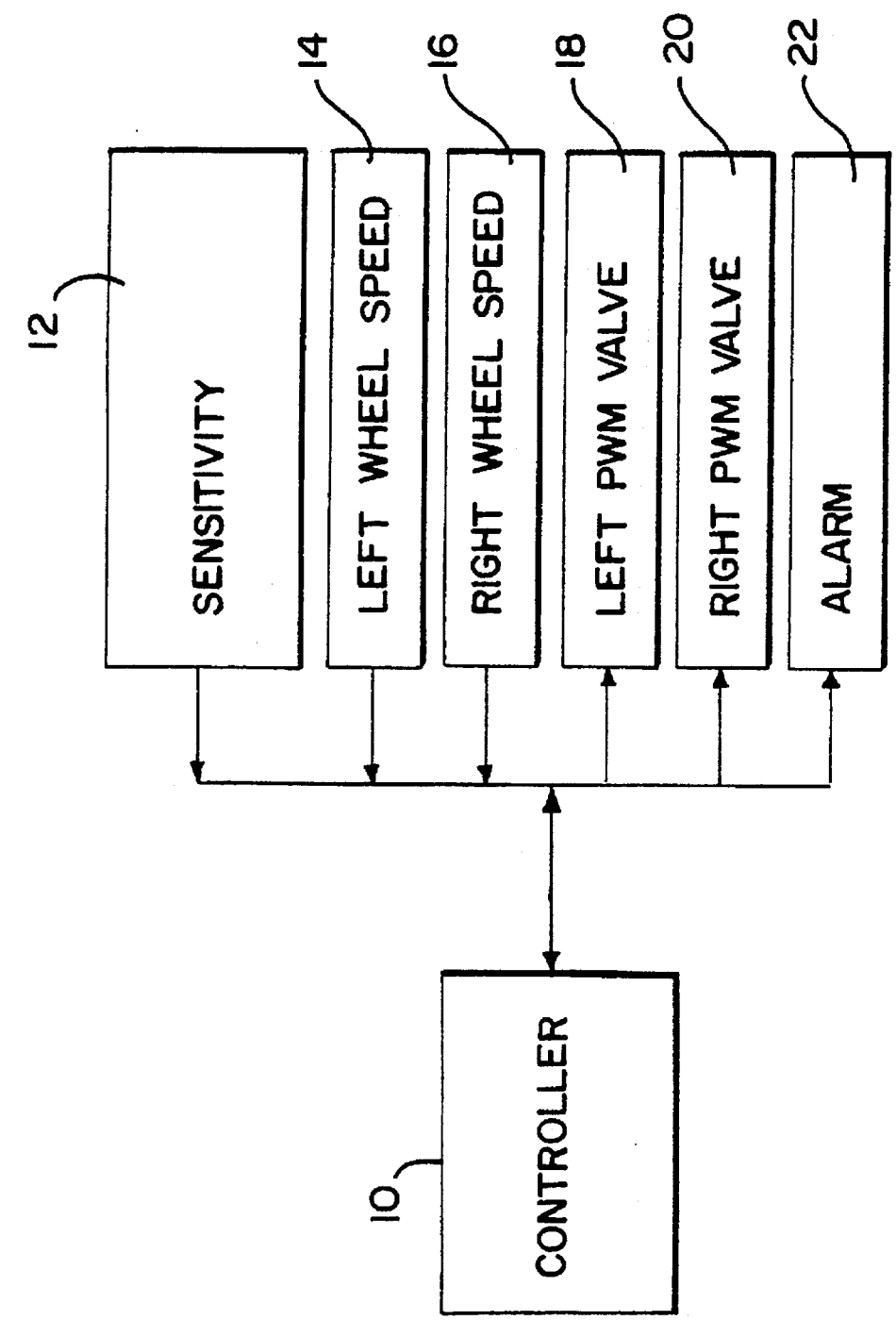
FIG. 1 is a block diagram schematically illustrating an electronic control system for operating a hydraulic control system of the invention.

FIG. 1 illustrates a block diagram of a controller 10 and its inputs 12, 14 and 16 and outputs 18, 20 and 22. As inputs, the controller 10 receives sensitivity 12, which is set (open or closed) by the operator on a switch (not shown) in the operator console, the left wheel speed 14, which comes from a suitable sensor of the speed of the left wheel, and the right wheel speed 16 which comes from a suitable sensor of the right wheel. Such switches and sensors are well known, may be of any suitable type, and need not be described in detail here.

The controller 10 has the capability to output a control signal to a left PWM valve 18, a right PWM valve 20 (see FIG. 3 for PWM valves 18 and 20) and to an alarm 22, which may for example be an error light which may be lit by the controller in case it senses a problem with the sensitivity switch, with the left or right wheel speed sensors, or with its internal diagnostics.

Figure 2:
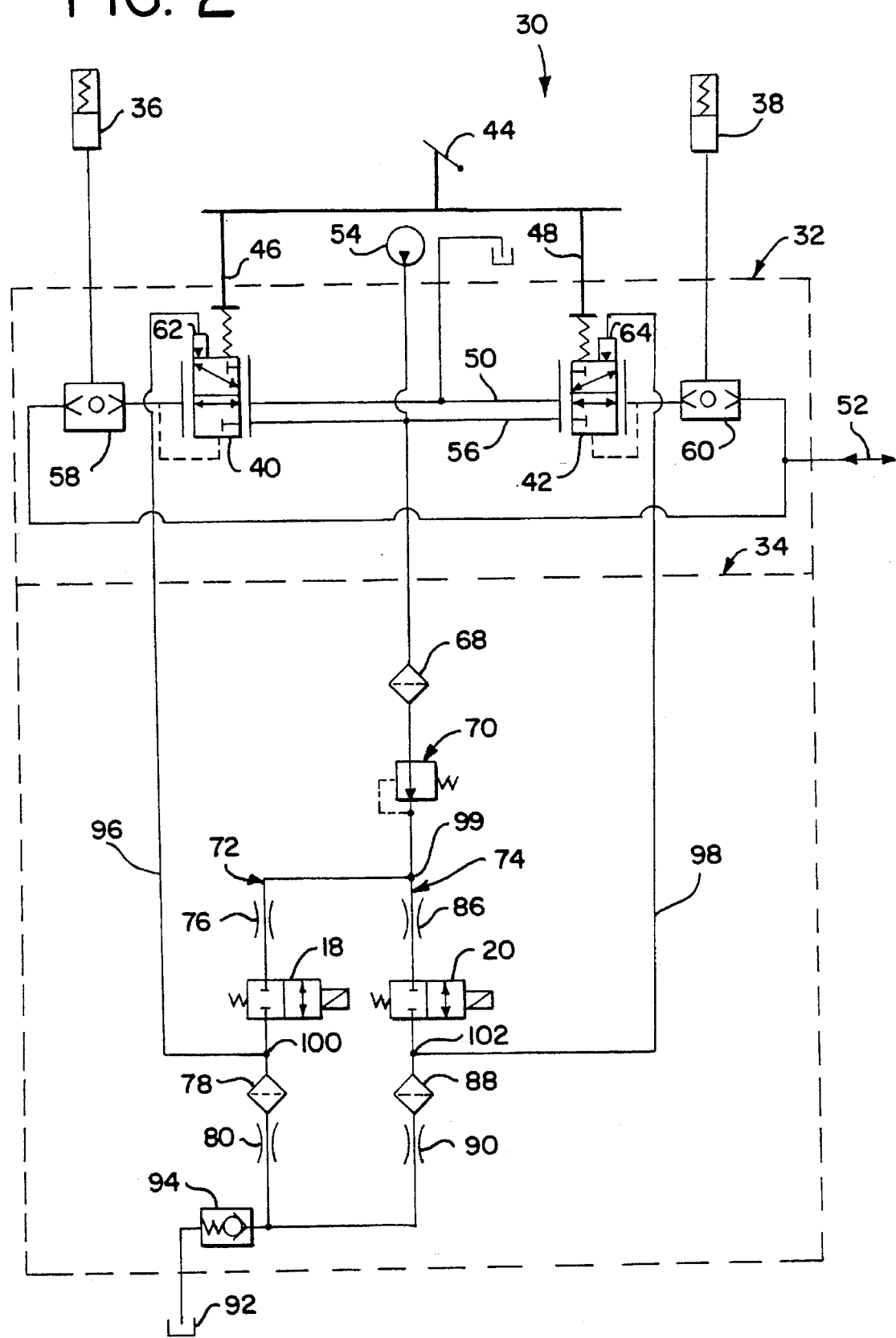
FIG. 2 is a circuit diagram of a brake type traction control system which includes an electro-hydraulic control system of the invention.

Referring to FIG. 2, a traction control system 30 includes a suitable brake system 32 and a hydraulic control system 34 of the invention. The brake system 32 may be any suitable hydraulically operated brake system having independent hydraulically actuated brake subsystems for independently operating the brakes on one side or the other of the vehicle in proportion to the pressure of the hydraulic actuating fluid applied.

The brake system 32 applies a hydraulic pressure to one or both brake assemblies 36 and 38. The brake assemblies 36 and 38 are schematically depicted as spring return cylinders, it being understood that the application of a hydraulic force to the assemblies 36 and 38 results in a braking torque being applied to the corresponding wheel (the left wheel for assembly 36 and the right wheel for assembly 38) in proportion to the pressure applied to the cylinder. Assemblies 36 and 38 may employ any suitable mechanism for doing this, for example, wet or dry disc brakes, drum brakes, etc.

The system 32 includes a left brake valve 40 and a right brake valve 42. The brake valves 40 and 42 are part of the vehicle's brake retarder system, and are operated independently of the vehicle's normal braking system, identified by arrow 52, by a separate retarder pedal 44. When the operator presses the retarder pedal 44, mechanisms 46 and 48 shift valves 40 and 42 from the positions illustrated in FIG. 2, in which the brake assemblies 36 and 38 are in communication with tank pressure 49 through line 50 (assuming no pressure is being applied through the normal braking system 52) to a position so as to communicate pressure from pump 54, typically driven by the vehicle's engine, through line 56 to the assemblies 36 and 38 through shuttle valves 58 and 60. Valves 40 and 42 are proportional valves so that the pressure communicated from line 56 to the assemblies 36 and 38 is proportional to the force supplied to treadle 44.

Shuttle valves 58 and 60 are provided so that the assemblies 36 and 38 will be placed in communication with either the valves 40 and 42, or with the normal vehicle braking system 52, which may apply braking force to not only the rear wheels (as does the retarder system) but also to the front wheels of the vehicle. As is well known, the shuttle valves 58 and 60 operate to communicate the higher of their two inlet pressures to the assemblies 36 and 38.

Besides being operable together by the treadle 44, each of the valves 40 and 42 are independently operable by a hydraulic pilot pressure. The pilot pressure for operating valves 40 and 42 through ports 62 and 64 is provided by the hydraulic control system 34 of the invention. Since the valves 40 and 42 are proportional valves, they provide a hydraulic pressure to the assemblies 36 and 38 which is proportional to the magnitude of the pilot pressure provided to their pilot pressure ports 62 and 64.

The system 34 may be incorporated into the traction control system by being provided in a separate manifold which interfaces with the manifold of the brake system 32. Typically, the system 34 will receive its operating pressure from the same source as does the brake system 32, in this case, from pump 54. The operating fluid from pump 54 is preferably filtered by filter 68 and then passes to a pressure reducing valve 70 where it is brought down to a pressure more suitable for the system 34. For example, pump 54 may provide fluid at 2500 psi and valve 70 may reduce it to a value such as approximately 600 psi. Fluid as conditioned by filter 68 and valve 70 is then supplied to two separate passageways 72 and 74, 72 being for developing a pressure to control the left brake valve 40 and 74 being for developing a pressure to control the right brake valve 42.

Passageway 72 includes upstream orifice 76, pulse width modulated (PWM) valve 18, filter 78 and downstream orifice 80. Right passageway 74 includes upstream orifice 86, PWM valve 20, filter 88 and downstream orifice 90. The outlets of downstream orifices 80 and 90 are in communication with one another and are communicated to tank 92 through check valve 94, which is provided to insure against reverse flow from tank 92. The pressure developed between valve 18 and downstream orifice 80 is communicated to pilot port 62 through line 96 and the pressure developed between valve 20 and downstream orifice 90 is communicated to pilot port 64 through line 98.

The valves 18 and 20 are each on/off valves. Such valves are well known and can be operated with a pulse width modulated electrical signal so as to vary the total "open" time over a set period according to the modulation ratio at which they are operated. For example, at a modulation ratio of 100%, each valve remains open continuously. At a 0% modulation ratio, each valve remains closed continuously. Between a modulation ratio of 0–100%, the valve alternates between being open and being closed at a fixed frequency, for example 33 Hertz, and the open time (or on time) for each period of the cycle increases from 0–100% proportionally to the modulation ratio.

In the preferred embodiment, the valves 18 and 20 are substantially as described in FIG. 1 of U.S. Pat. No. 5,011,113, the disclosure of which is hereby incorporated by reference. Pulse width modulated valves which may be used as the valves 18 and 20 are commercially available from Applied Power Inc. of Butler, Wis. In the preferred embodiment, these valves are provided with coils so as to operate at 24 volts and at a frequency of 33 Hertz.

So as to produce a pressure signal at node 100 having the desired characteristics, upstream orifice 76 is sized so as to be larger than downstream orifice 80. Likewise, a pressure signal of the desired characteristics at node 102 is provided by sizing orifice 86 greater than orifice 90. When open, the flow area through each of valves 18 and 20 is preferably greater than the flow area through the respective orifice 76 or 86, so as to produce little or no pressure drop across the respective valves 18 and 20 when they are open. In the preferred embodiment, the upstream orifices 76 and 86 provide a 0.030 inch opening and the downstream orifices 80 and 90 provide a 0.015 inch opening.

By sizing orifices 76 and 86 appropriately relative to the downstream orifices 80 and 90, the pressures developed at the respective nodes 100 and 102 are averaged so as to produce a smooth signal which is not abrupt but has a fast response. In addition, system 34 is adaptable to different hydraulic operated brake systems and pressure supplies and can be provided at relatively low cost.

The magnitude of the pressure signal at the respective nodes 100 and 102 varies proportionally with the modulation ratio at which the respective valves 18 and 20 are operated. For example, if the pressure $P_{100}$ at node 100 has a magnitude of $X_{100}$ at a modulation ratio of valve 18 ($MR_{left}$)=100% (at which valve 18 is continuously open) and has a magnitude of $Y_{100}$ at $MR_{left}$=0% (at which valve 18 is continuously closed), then for $MR_{left}$ expressed as a fraction between 0–1 (representing 0–100%), the equation $$P_{100}=[(X_{100}-Y_{100})* MR_{left}]+Y_{100} \qquad \text{Equation 1}$$

can be used to estimate $P_{100}$.

Similarly, if the pressure $P_{102}$ at node 102 is $X_{102}$ at a modulation ratio of valve 20 ($MR_{right}$)=100% and is $Y_{102}$ at $MR_{right}$=0%, then for $MR_{right}$ expressed as a fraction between 0–1 (representing 0–100%), the equation $$P_{102}=[(X_{102}-Y_{102})* MR_{right}]+Y_{102} \qquad \text{Equation 2}$$

can be used to estimate $P_{102}$.

Figure 3:
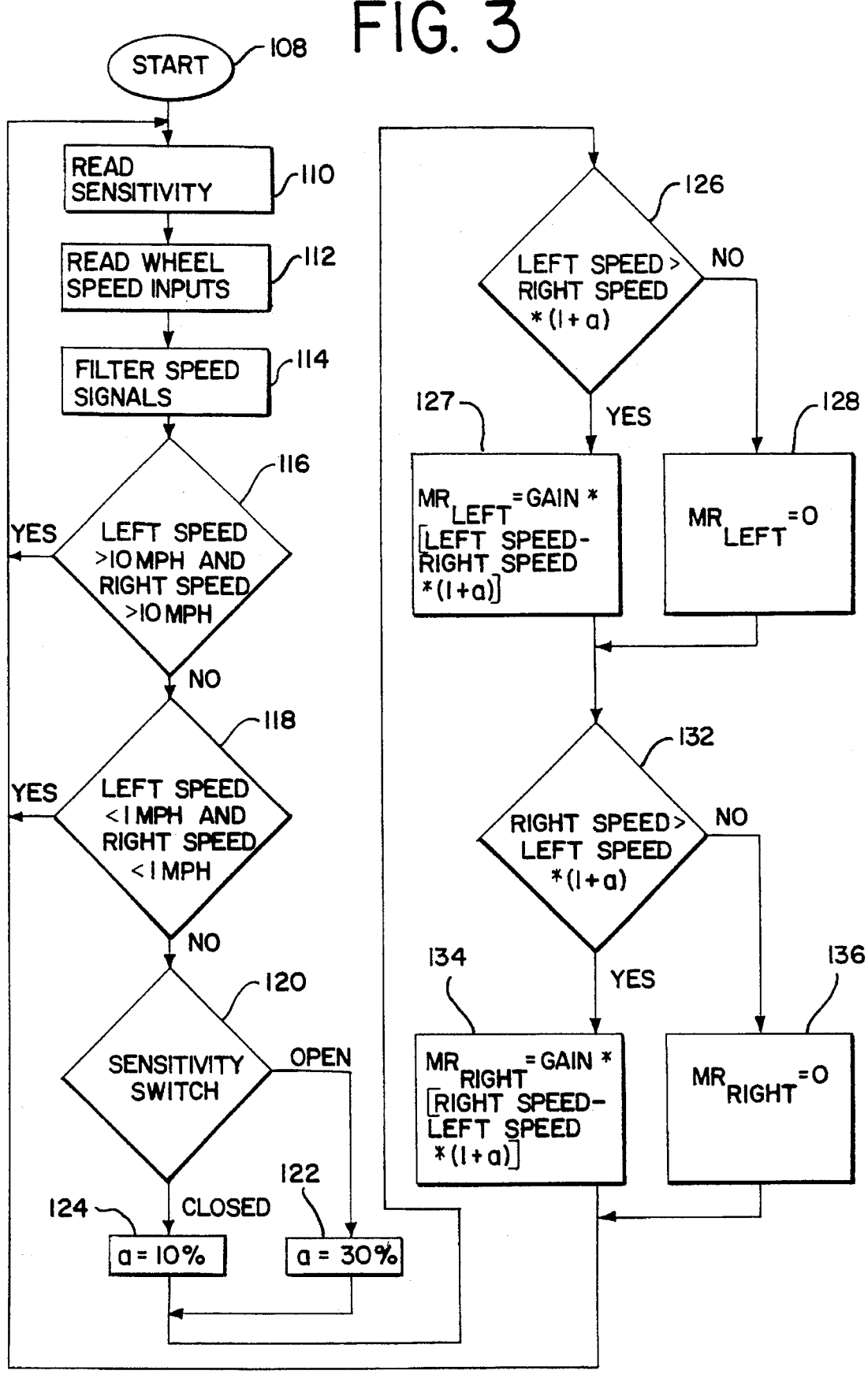
FIG. 3 is a schematic diagram of a flow chart illustrating an algorithm by which the controller of FIG. 1 may be programmed to operate.

The signals for operating the valves 18 and 20 are generated by the controller 10 using the algorithm schematically depicted in FIG. 3. After powering up (step 108), the sensitivity switch is read at step 110 followed by reading the wheel speed inputs from the left and right wheel speed sensors at step 112. Preferably, each speed signal is filtered by calculating a running average of the most recently polled speeds. For example, this may be accomplished using a finite impulse response filter (FIR filter) such as by calculating a filtered speed signal for subsequent processing equal to the current speed signal plus the last three speed signals divided by 4. This is done in step 114 and the filtered left and right speed signals are used for all subsequent processing steps.

At step 116, it is determined whether both the left and right speeds are above 10 mph. If so, the routine starts over at step 110. If not, it is determined whether both speeds are less than 1 mph at step 118. If so, the process starts over at step 110, but if not, traction control proceeds.

At step 120 it is determined whether the sensitivity switch, read at step 110, is open or closed. If open, the variable a is set equal to 30% (step 122) and if closed the variable a is set equal to 10% (step 124). The value of a may be set at any desired level, depending on at what differential in speed between the left and right wheels it is desired for the traction control system to apply a braking torque to the faster rotating wheel, taking into account that in normal turning speed differences between the left and right wheels do occur.

For example, when performing a tight turn under normal conditions, the speed differential between the left and right rear wheels may be more than 10% but less than 30%, and it would not be desirable for the traction control system to apply the brake to the faster (outside) wheel under those conditions. Thus, the driver would set the sensitivity switch to 30% (open) in that case. However, for a relatively straight path but slippery conditions, the driver may want to set it at 10% (closed), to provide the most efficient power transfer to the wheels.

At step 126, if the left speed is determined to be greater than the right speed multiplied by a factor of 1 plus the variable a (either 0.10 or 0.30), then the modulation ratio for controlling the left valve 18 is set equal to the value indicated in step 127. If not, the left modulation ratio is set equal to 0 in step 128.

Next, in step 132, it is determined whether the right speed is greater than the left speed times a factor of 1 plus the variable a. If so, the modulation ratio for controlling the right valve 20 is set equal to the value indicated in step 134 and if not the modulation ratio for the right valve 20 is set equal to 0 in step 136. After that, the process starts over starting with step 110.

Controllers capable of executing the algorithm identified in FIG. 3 and controlling valves 18 and 20 are well known in the art. Such a controller is preferably a microprocessor based system with built-in frequency to analog converters which will convert alternating signals (pulse signals) to analog voltage signals. The controller reads the analog signals to monitor the wheel speeds and sensitivity setting. Also, preferably, the controller has 8 high powered digital outputs and generates pulse width modulated drive signals for the valves 18 and 20. The outputs should be provided with short circuit protection.

Typically, the controller can be easily adapted for various sizes and dynamics of vehicles by setting proper system parameters. The controller should have a non-volatile memory so that the system parameters can be stored. A communication port on the controller can be used to set these parameters through a standard personal computer. A controller such as this which is readily adaptable for use with the invention is available from Applied Power Inc. of Butler, Wis.

Many modifications and variations to the invention will be apparent to those skilled in the art. For example, the valves 18 and 20 could be positioned in the respective passageways 72 and 74 upstream of the respective orifices 76 and 86, downstream of nodes 100 and 102, or downstream of the downstream orifices 80 and 90. If the valves 18 and 20 were placed downstream of the respective nodes 100 and 102, they would have to be made normally open (i.e., spring biased open) or, if spring biased closed (normally closed), the modulation ratio signal input to them would have to be adjusted so as to produce the desired response (i.e., it would normally be on, and the off time would increase proportionally with the speed difference). Also, other control algorithms could be used to practice the invention, for example, in which the amount of modulation was dependent on the integral of the slip signal or the derivative of the slip signal, or adaptive control or fuzzy rules could be employed. Therefore, the invention should not be limited to the embodiments described but should be defined by the claims which follow.

We claim:

1. In a vehicle traction control system of the type having a hydraulic pressure operated brake system for controlling the braking torque on at least two powered wheels on opposite sides of a vehicle and a hydraulic pressure control system including at least two pulse width modulated valves for operating said brake system, said brake system being of the type which can apply a braking torque to a powered wheel on one side of the vehicle or to a powered wheel on the other side of a vehicle in response to sensing a difference in speeds between the wheels on the two sides, the braking torque being applied to the faster rotating wheel, the improvement wherein:

said hydraulic pressure control system includes, for each of at least two powered wheels:

a hydraulic pressure passage for conducting a flow stream of hydraulic fluid;

an upstream orifice in said passage through which said stream flows; and a downstream orifice in said passage through which said stream flows; and wherein one of said pulse width modulated valves is provided in said passage in communication with said orifices in said passage for developing a hydraulic control pressure in said passage between said orifices for operating said brake system; and means for communicating said hydraulic control pressure from a point in said passage between said orifices to said brake system;

wherein said flow stream enters said passage through said upstream orifice and is relieved from said passage through said downstream orifice; and wherein the pressure of said flow stream on the side of said upstream orifice which is between said orifices is less than the pressure of said flow stream on the opposite side of said upstream orifice and the pressure of said flow stream on the side of said downstream orifice which is between said orifices is greater than the pressure of said flow stream on the opposite side of said downstream orifice.

2. The improvement of claim 1, wherein said valve is between said orifices.

3. The improvement of claim 2, wherein said control pressure is developed between said valve and said downstream orifice.

4. The improvement of claim 1, wherein said upstream orifice is larger than said downstream orifice.

5. The improvement of claim 4, wherein a flow area through said valve when said valve is open is larger than said upstream orifice.

6. The improvement of claim 1, wherein said valve is controlled according to a difference between running averages of the most recent wheel speeds on the two sides.

7. The improvement of claim 1, wherein said downstream orifice permanently communicates with a tank pressure line of said hydraulic pressure control system.

* * * * *